May 29, 1962
A. SILVER
3,036,587
MANUALLY PILOTED PRESSURE OPERATED VALVE
Filed Jan. 8, 1958
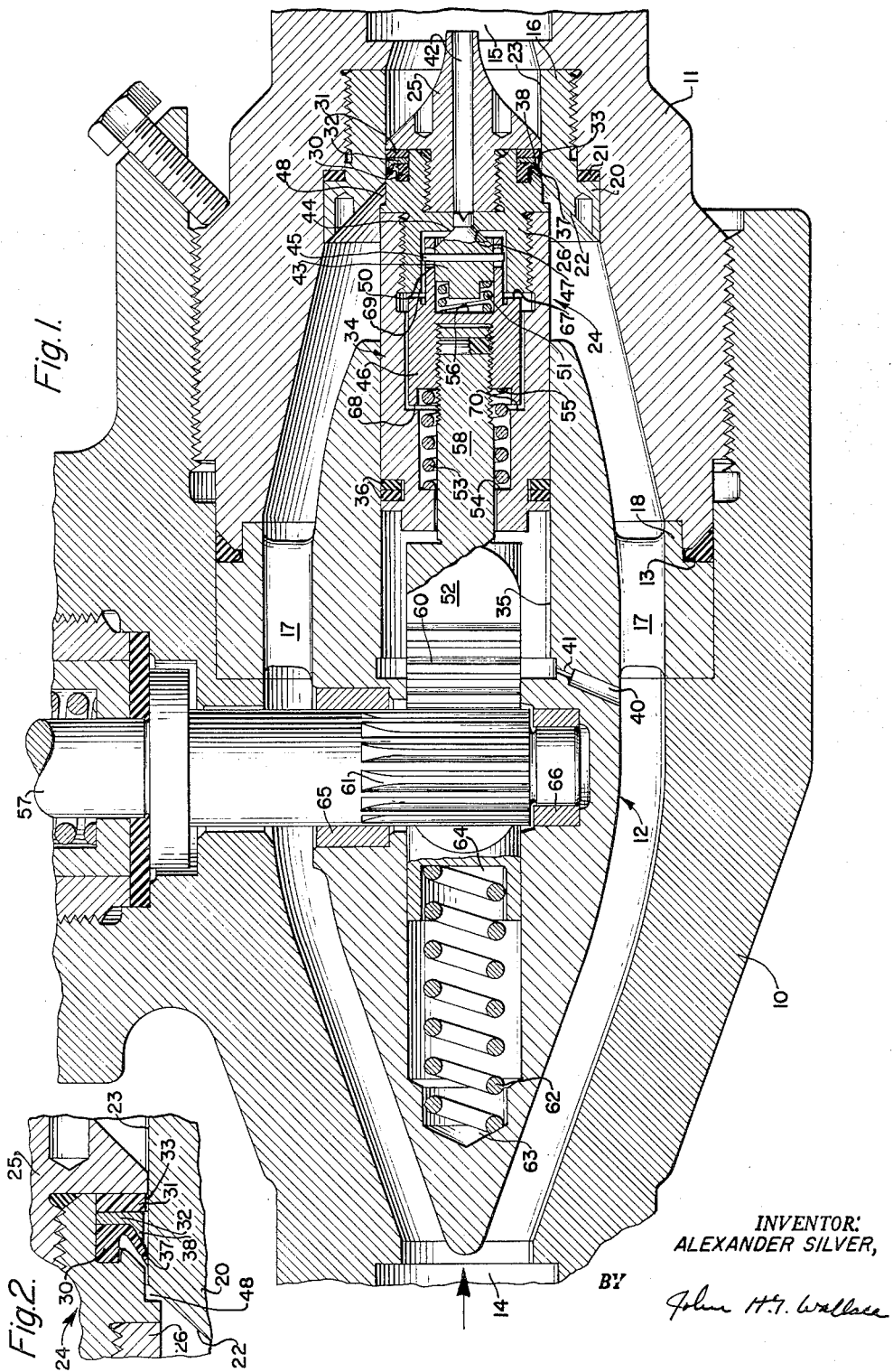
INVENTOR:
ALEXANDER SILVER,
BY John H.J. Wallace

United States Patent Office 3,036,587
Patented May 29, 1962

3,036,587
MANUALLY PILOTED PRESSURE OPERATED
VALVE
Alexander Silver, East Woodland Hills, Calif., assignor to
The Garrett Corporation, Los Angeles, Calif., a corporation of California
Filed Jan. 8, 1958, Ser. No. 707,782
3 Claims. (Cl. 137—219)

This invention pertains to valves and more particularly to an inserted plug type valve in which the manual operation of the valve is assisted by the pressure of the fluid controlled by the valve.

In previous valves of the poppet type, several problems have existed such as insuring quick and positive operation of the valve, tight closing, preventing eroding of the valve seat surfaces due to wire drawing when high pressure fluids are controlled by the valve, reducing cavitation of the fluid controlled by the valve and maintaining good throttling characteristics over the full range of the valve. The problem of providing a quick and positive means for operating the valve is aggravated as the pressure of the fluid being handled by the valve is increased, due to the larger differential pressure across the valve. Additional problems arise in valves which handle cryogenic fluids such as liquid oxygen or liquid nitrogen because the low temperature of those fluids tends to freeze the various parts of the valve and cause radical changes in the dimensions of the valve parts. Also, cryogenic fluids tend to flash into a vapor and cause cavitation in the valve due to their extremely low vapor pressure.

The valve of this invention would solve the above problems by providing an inserted plug type of valve in which the pressure of the fluid controlled by the valve is used to assist the manual operation of the valve. This pressure is applied to the inlet side of a piston which moves the valve plug to assist in closing the valve while the pressure on the inlet side of the piston is reduced to allow the pressure on the other side of the piston to open the valve. In cases where the valve plug or piston sticks or the pressures are too low, the mechanical actuating means will override the other forces and mechanically open or close the valve. In order to prevent undue wear or eroding of the obturating surfaces of the valve, the plug is provided with two separate seals. The first occluding seal also serves as a wiper member which removes any dirt or other foreign particles from the surfaces and in addition essentially stops the flow through the valve prior to the final seating of the second occluding seal. By reducing the flow through the valve, any tendency of the second occluding seal to erode due to wire drawing is eliminated, thus allowing the use of plastic material for the seals which is unaffected by cryogenic fluids.

Accordingly, the principal object of this invention is to provide a valve of the inserted plug type with a novel actuating means for moving the valve plug.

A further object of this invention is to provide a valve of the inserted plug type with a novel actuating means which utilizes the pressure of the fluid controlled by the valve for assisting the manual actuating means to operate the valve.

A still further object of this invention is to provide a valve of the inserted plug type with a unique actuating means which utilizes the pressure of the fluid controlled by the valve to assist the manual actuating means for moving the valve plug. In addition, the pressure which is used to move the valve plug to a closed position is vented to the downstream side of the valve prior to moving the valve plug to an open position in order that the pressure on the opposite side of the operating means may assist in opening the valve.

Another object of this invention is to provide a valve of the inserted plug type with a novel means for substantially stopping the flow of fluid through the valve prior to the engagement of the principal occluding surface of the valve during the closing operation of the valve and to delay flow through the principal occluding member during the opening of the valve.

Still another object of this invention is to provide a valve of the inserted plug type with a unique multiple seal means for cleaning one of the occluding surfaces of the valve prior to the engagement of this surface by the principal flexible seal of the valve.

Another object of this invention is to provide a valve having a minimum pressure drop to reduce cavitation and turbulence, so that it can be used with cryogenic liquids or liquids near their flashing point and yet at the same time be suitable for high pressure operation. In addition the valve requires a minimum of externally applied forces to actuate it, thus greatly increasing the range of usefulness of the valve.

These and other objects and advantages of this invention will be more easily understood by those skilled in the art from the following detailed description when taken in conjunction with the attached drawings, in which:

FIG. 1 is a longitudinal section of the plug valve showing the actuating means and the means used for sealing one of the occluding surfaces of the valve structure according to this invention; and FIG. 2 is a fragment of a longitudinal section drawn to an enlarged scale and showing the details of the means used for cleaning one of the occluding surfaces of the valve and essentially stopping the flow of fluid through the valve, prior to its complete closing.

Referring now to the drawing, there is shown a plug type valve having a tubular valve body consisting of a left-hand tubular portion 10 and a right-hand tubular portion 11 which threads into the left-hand portion. The outer ring 18 of a support member 12 for the valve plug is locked in position in the valve body between the adjacent ends of the left-hand and right-hand members with a flexible sealing ring 13 provided at the end of the right-hand member 11 to insure a tight joint between the two members. The main body of the support member 12 is provided with a streamlined shape to reduce the turbulence of the fluid flowing through the valve, with the main body of the member 12 being supported from the ring 18 by a plurality of webs 17. The left-hand portion 10 of the valve body is provided with an inlet opening 14 which connects with the central bore in the valve body while the right-hand portion is provided with an outlet opening 15 for the valve, also connecting with the bore.

Threaded into the right-hand portion 11 adjacent the outlet opening 15 is a valve seat insert 16. The valve seat insert is provided with an outwardly projecting flange 20 which engages an inwardly projecting shoulder formed on the right-hand portion 11 with a sealing ring 21 being disposed between the adjacent surfaces to insure a tight seal. The valve seat insert 16 is provided with a conically shaped surface 22 which is formed on the outwardly projecting flange 20, and the inner edge of the surface 22 connects with a cylindrical bore 23 formed in the insert 16 to provide a smooth flow path conforming to the interior shape of the valve body.

A valve plug 24 is disposed for axial movement in the bore 23 of the valve seat insert to control communication between the inlet and outlet openings in the valve body. The valve plug 24 is provided with a nose member 25 which threads into a valve seat member 26 which also serves as a stop to limit the movement of the valve plug 24 toward the outlet 15.

A Chevron ring 30, a wiper ring 31, and spacing ring 32, are positioned between the adjacent surfaces of the nose member 25 and the valve seat member 26 to insure a tight seal between the valve plug 24 and the surface of the bore 23. The seal rings 30 and 31 are preferably formed of a resilient material, which is easily formed and unaffected by cryogenic fluids such as thin metal or fluorocarbons known commercially as Kel–F or Teflon. The expanded diameter of the wiper seal ring 31 should be slightly larger than the diameter of the bore 23 so that the flow through the valve will be substantially stopped when the wiper seal ring 31 enters the left-hand end of the bore 23. In order to insure that a small pressure differential exists for expanding the Chevron ring 30, a small axial notch 33 is provided in the outer surface of the ring 31. Ring 30 is a flexible Chevron type of ring and is provided with a conically shaped flange 37 at its outer periphery which projects towards the inlet end of the valve as seen in FIG. 2. The flange 37 will be expanded by the pressure of the fluid controlled by the valve and insure a tight seal between the valve plug 24 and the bore 23. The metal spacing ring 32 also has a conical shaped flange 38 which projects towards the inlet end of the valve and serves to support the flange 37 and prevent its expanding or flaring out too far.

The use of a seal ring 31 having a slightly larger overall diameter than the bore 23 provides a means whereby the flow through the valve will be substantially shut off prior to the engagement of the flange 37 of the Chevron seal 30. By reducing the flow through the valve prior to engaging the Chevron seal, any tendency is eliminated of the Chevron seal to erode due to the high velocity of the fluid past the surfaces immediately prior to engagement of them. The reduced flow also eliminates the tendency of the Chevron seal 30 to expand or flare out as it enters the bore 23, which increases the life of the seal. This is very important in valves handling high pressure fluids and especially liquids which tend to flash, because they tend to erode away most materials which may be used for seals with such fluids. Also when cryogenic fluids are handled, it is usually preferred to make the wiper seal 31 of Teflon because of its natural lubricating properties, while the Chevron seal 30 is made of Kel–F because of its better flexibility at low temperatures. It should also be noted that the seal rings 30 and 31 are backed up by the nose member 25 which limits the tendency of these members to shrink at low temperatures, thus maintaining a tight seal.

The left-hand end of the valve seat member 26 threads into a piston member 34 which is disposed for axial movement in a cylinder 35 formed in the valve plug support 12. Two piston rings 36 are disposed on the outer periphery of the piston member 34 to insure a tight seal in the cylinder 35. A fluid inlet passageway 40 is formed in the wall of the valve plug support 12 and is provided with a flow control restriction 41 so that a controlled amount of fluid is admitted to the cylinder 35. The piston member is provided with a central bore which connects with a passageway 42 in the nose member 25 in order that fluid admitted to the cylinder 35 may be vented to the downstream or outlet side of the valve. A pilot valve 43 is disposed in the center bore of the piston member 34 for closing off the end of passageway 42 to operate the valve as will be described below. The pilot valve 43 is provided with a conical valve seat surface 44 which engages the end 47 of the passageway 42 to close off the passageway. The pilot valve 43 is urged to the right by means of a spring 51 which reacts against the end 56 of a cup-shaped recess formed in the end of a member 46 which is attached to the end of a piston rod 52. A retaining pin 45 which is secured to the pilot valve 43 projects into diametrically opposed slots 50 formed in the member 46 in order to prevent the pilot valve member 43 from becoming disassociated from the member 46. The spring 51 is provided for limiting the amount of force which can be exerted by means of the piston rod 52 and the valve actuating mechanism on the pilot valve 43 in order to prevent undue damage to the valve seat surface 44.

The piston rod 52 has a reduced portion 58 at its right-hand end, which extends into the central bore of the piston member 34, and a rack 60 formed on its left-hand end. A pinion 61 which is formed on the end of a shaft 57 meshes with the rack 60 to move the piston rod 52 axially in the valve body. The shaft 57 is rotatably mounted in the valve plug supporting member 12 by means of spaced bearings 65 and 66 and is provided with a suitable stop (not shown) to limit its rotation. A coil spring 53 is disposed in the central bore of the piston member 34 and reacts against an inwardly projecting shoulder 54 on the piston member 34 at its left-hand end and a shoulder 55 on the end of the member 46 at its right-hand end to urge the piston to the left. A second spring 62 which is disposed at the left-hand end of the piston rod is provided for urging the piston rod to the right. The spring 62 reacts at one end against the end of a cup-shaped recess 63 formed in the supporting member 12 and at its other end against the end wall of a recess 64 formed in the end of the piston rod 52. The spring 62 is provided for removing the lost-motion from the pinion and rack combination which is used for actuating the valve. The member 46 is provided with shoulders 67 and 68 at opposite ends which engage the end surface 69 of the end member 26 and a shoulder 70 on the piston 34 respectively, to limit the free movement of the piston 34. The piston 34 is free to move or float between limits of shoulders 67 and 68 at all times in order that the pressure of the fluid controlled by the valve may assist in moving the piston, as will be explained below.

The above valve is shown in the closed position in the attached drawing and when it is desired to open the valve, shaft 57 is rotated to move the piston rod 52 to the left. As piston rod 52 moves to the left, the pilot valve 43 is first opened slightly permitting fluid from the upstream side of the valve to flow through the passageway 40 into the cylinder 35 and then through the passageway 42 to the downstream side of the valve. This will bleed the pressure from the cylinder 35 since the pilot valve 43 has a larger capacity than the flow restriction 41. This reduction in pressure in the cylinder 35 will permit the force developed by the pressure acting on the difference in area 48 between the portion of the plug 24 in the cylinder 35 and the portion in the bore 23 of the valve seat insert 16 to move the valve plug to the left. As the valve plug 24 moves to the left it will stop as it approaches the pilot valve member 43 and the forces due to the pressures are balanced unless the piston rod 52 is moved further to the left to further open the pilot valve 43. If this force is not sufficient to move the valve plug 43. to the left, the shoulder 68 will contact the shoulder 70 and the mechanical actuator will open the valve by rotating the shaft 57.

When the valve is fully open, and it is desired to close the valve, the shaft 57 must be rotated in the direction required to move the piston rod 52 to the right. As the piston rod 52 moves to the right, the pilot valve member 43 will close the end of the passageway 42, thus preventing the venting of fluid pressure from the interior of the cylinder 35. The pressure acting on the end of the piston member 34 will then build up and assist in moving the valve plug 24 to the right to close the valve. Again the valve plug 24 will stop when the forces due to the pressure of the fluid are balanced unless the piston rod 52 is moved further to the right to close the pilot valve 43. As the nose member 25 of the valve enters the bore 23 the wiper seal 31 will remove foreign matter from the bore 23 which is formed on the valve seat insert 16. After the seal ring 31 enters the bore 23 and substantially seals off the outlet opening, and reduces the velocity of the fluid flowing past the Chevron seal 30, the Chevron seal 30 will then enter the bore and be expanded by fluid pressure to effect a tight seal. By reducing the velocity of the fluid any tendency of the sealing surface of the Chevron seal 30 to erode due to wire drawing when closing the valve is greatly reduced.

This invention thus provides a semi-floating valve plug 24 which will tend to seek a position which will balance the pressure forces acting upon it and the force of spring 23. If within a very small range of motion of the piston rod, the valve plug does not follow, then the shoulders on the piston rod are engaged and the force of the piston rod will be transmitted directly to the valve plug. The valve is thus positioned by using the available differential pressures acting on the area 48 of the valve plug when available which are overridden within a very short stroke by direct mechanical operation.

While but one preferred embodiment of this invention has been described in detail, many modifications and changes will occur to those skilled in the art to which it pertains, within its broad spirit and scope.

I claim:

1. A valve comprising: a valve body having an inlet and a generally cylindrical outlet; a hollow member supported in said valve body and defining therewith a generally annular flow passage providing communication between said inlet and said outlet; a valve plug slidably mounted in said hollow member and having a first and second sealing means formed of resilient material and disposed for movement into and out of said cylindrical outlet, said first sealing means having a slightly larger diameter when expanded than the diameter of said outlet so as to engage the surface of the cylindrical outlet to substantially shut off the flow through the valve and clean said surface, the second sealing means having a conically shaped flange at its outer periphery which projects toward the inlet end of the valve so that upon entering the outlet it will be expanded by the pressure of the fluid controlled by the valve to insure a tight seal between the valve plug and the outlet, said first sealing means having a notch in the outer surface thereof to insure a pressure drop across said second sealing means when said first and second sealing means are both in said outlet; and actuating means including means responsive to the pressure of the fluid controlled by the valve for moving said valve plug.

2. A valve comprising: a valve body having an inlet and a generally cylindrical outlet; a hollow member supported in said valve body and defining therewith a generally annular flow passage providing communication between said inlet and said outlet; a valve plug slidably mounted in said hollow member and having first and second sealing means formed of a resilient material and disposed for movement into and out of said cylindrical outlet, said first sealing means having a slightly larger diameter when expanded than the diameter of said outlet so as to engage the surface of the cylindrical outlet to substantially shut off the flow through the valve and clean said surface, the second sealing means having a conically shaped flange at its outer periphery which projects toward the inlet end of the valve so that upon entering the outlet it will be expanded by the pressure of the fluid controlled by the valve to insure a tight seal between the valve plug and the outlet, said first sealing means having a notch in the outer surface thereof to insure a pressure drop across said second sealing means when said first and second sealing means are both in said outlet; a spacing ring between said first and second sealing means, the outer diameter of said spacing ring being slightly smaller than the diameter of said outlet; and actuating means including means responsive to the pressure of the fluid controlled by the valve for moving said valve plug.

3. A valve comprising: a valve body having an inlet and a generally cylindrical outlet; a hollow member supported in said valve body and defining therewith a generally annular flow passage providing communication between said inlet and said outlet; a valve plug slidably mounted in said hollow member and having first and second sealing means formed of a resilient material and disposed for movement into and out of said cylindrical outlet, said first sealing means having a slightly larger diameter when expanded than the diameter of said outlet so as to engage the surface of the outlet to substantially shut off the flow through the valve and clean said surface, the second sealing means having a conically shaped flange at its outer periphery which projects toward the inlet end of the valve so that upon entering the outlet it will be expanded by the pressure of the fluid controlled by the valve to insure a tight seal between the valve plug and the outlet, said first sealing means having a notch in the outer surface thereof to insure a pressure drop across said second sealing means when said first and second sealing means are both in said outlet; a spacing ring between said first and second sealing means having a conically shaped flange which projects toward the inlet of the valve and serves to support a portion of the conically shaped flange of the second sealing means, the outer diameter of said spacing ring being slightly smaller than the diameter of said outlet; and actuating means including means responsive to the pressure of the fluid controlled by the valve for moving said valve plug.

References Cited in the file of this patent

UNITED STATES PATENTS

| | | |
|---|---|---|
| 870,597 | Tschopik et al. | Nov. 12, 1907 |
| 1,540,400 | Kellan | June 2, 1925 |
| 1,941,357 | Kruse | Dec. 26, 1933 |
| 2,192,499 | Larner | Mar. 5, 1940 |
| 2,213,998 | Sifkovitz | Sept. 10, 1940 |
| 2,662,721 | Giauque | Dec. 15, 1953 |
| 2,687,141 | Baker | Aug. 24, 1954 |
| 2,698,158 | Granberg | Dec. 28, 1954 |
| 2,771,091 | Baker | Nov. 20, 1956 |

FOREIGN PATENTS

| | | |
|---|---|---|
| 660,970 | Great Britain | Nov. 14, 1951 |
| 769,323 | Great Britain | Mar. 6, 1957 |